Patented May 7, 1940

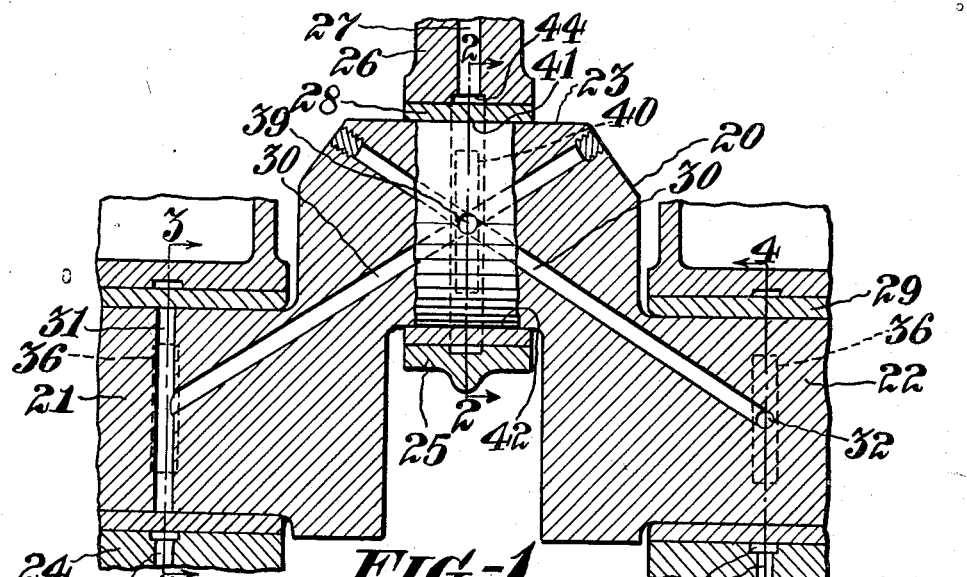
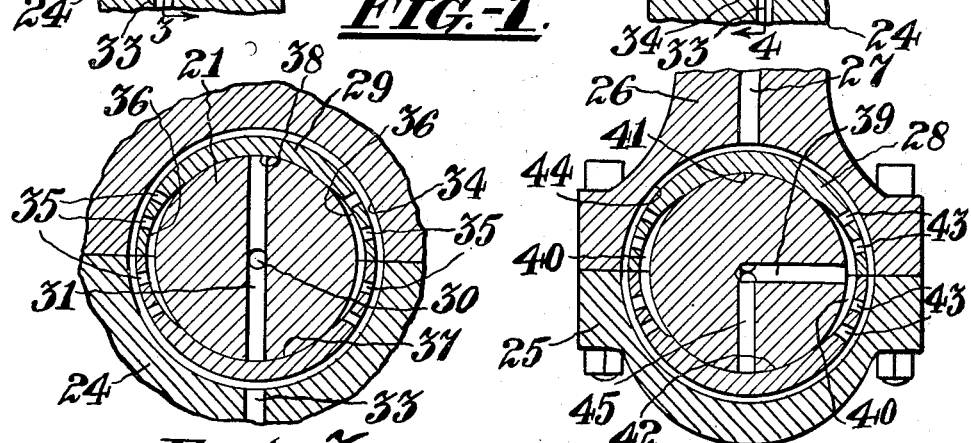
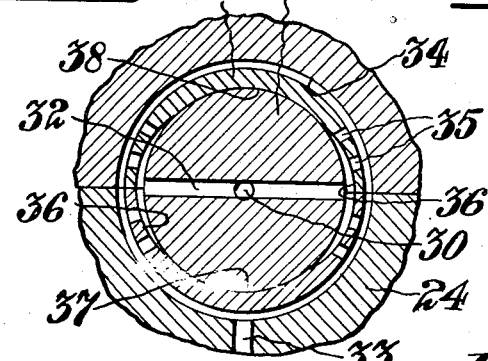

2,199,699

UNITED STATES PATENT OFFICE 2,199,699

OILING DEVICE

Fritjof Frelin, Phillipsburg, N. J., assignor to Ingersoll-Rand Company, Jersey City, N. J., a corporation of New Jersey Application March 11, 1937, Serial No. 130,233

3 Claims. (Cl. 184—6)

This invention relates to oiling devices, and more particularly to an oiling device for the bearing portions of a crank shaft.

One object of the invention is to assure a maximum area of contact between the crank pin and the bearing arranged thereon.

Other objects will be in part obvious and in part pointed out hereinafter.

In the drawing accompanying this specification and in which similar reference numerals refer to similar parts, Figure 1 is a longitudinal elevation, in section, of a crank shaft equipped with an oiling device constructed in accordance with the practice of the invention, and Figures 2, 3 and 4 are transverse views taken through Figure 1 on the lines 2—2, 3—3 and 4—4, respectively.

Referring more particularly to the drawing, 20 designates a crank shaft having shaft portions 21 and 22 lying on opposite sides of the crank pin 23 and journalled in bearings 24.

On the crank pin 23 is a bearing 25 of a connecting rod 26 provided with the usual passage 27 for conveying oil under pressure to the bearings within a piston. In the bearings 25 and 24 are liners 28 and 29, respectively, to provide renewable bearing surfaces for the bearings.

In accordance with the practice of the invention the crank shaft is provided with an oil passage 30 which extends from a point in the shaft portion 21 intermediate the ends of the adjacent bearing 24 through the crank pin 23 and into the portion 22 of the shaft to a point intermediate the ends of the associated bearing 24. The portions of the shaft 21 and 22 are provided with transverse holes 31 and 32, respectively, which extend entirely through the shaft. The holes communicate with the ends of the passage 30 and are arranged at right angles with respect to each other.

In the structure illustrated oil under pressure, for supplying the passages 31 and 32, is conveyed through passages 33 in the bearings 24, and issues into annular grooves 34 in the inner surfaces of the bearings. The liners 29 overlie the grooves 34 and have apertures 35 through which oil passes from the grooves 34 into arcuate grooves 36 in the inner surfaces of the liners 29. The grooves 36 preferably include an arc of approximately 90° and are located outside of the essential bottom and top bearing areas 37 and 38 of the liners so that the bearing areas may extend unbroken from end to end of the liners.

In order to avoid perforating the peripheral surface of the crank pin 23 within the maximum pressure areas of contact between the crank pin and the connecting rod bearing the outlet passage 39 which conveys oil to the connecting rod bearing from the passage 30 opens into the surface of the pin 23 at a point off-set with respect to a plane extending through the axes of the crank shaft and the crank pin 23. The passsage 39 is preferably arranged normal to such plane and, during the rotation of the crank shaft, is carried into registry with arcuate grooves 40 arranged in non-communicating relationship with respect to each other in the inner surface of the liner 28.

The grooves 40 also have an arc of 90° and lie on opposite sides of the top and bottom bearing surfaces 41 and 42, respectively, of the liner. In the liner 28 are a series of perforations 43 opening into an annular groove 44, in the connecting rod bearing, communicating with the passage 27.

In structures wherein it is essential that a continuous flow of oil be delivered through the passage 27 in the connecting rod, as when the oil is used for cooling the piston head, the crank pin is provided with an additional passage 45 similar to and arranged at right angles to the passage 39.

In operation, and as the crank shaft rotates, the ends of the passage 30 are alternately opened to oil supply through the ports and passages affording communication between the passages 30 and 33. In other words, as one passage, for example that designated 31, moves out of communication with the associated grooves 36 the other passage 32 moves into communication with the adjacent grooves 36. In this way there will be a constant flow of oil through the passage 30 and either the passage 39 or 45 into a groove 40 and, therefore, to the passage 27.

In practice, the present invention has been found to be highly efficient, particularly for use in connection with structures of which the bearings are subjected to heavy pressures. By arranging the passages, ports and grooves in the manner described the essential areas of contact of the shaft portions 21 and 22 and of the crank pin 23 with their respective bearings will be uninterrupted from one end of the bearings to the other and at the same time an ample and continuous supply of oil will be delivered to the bearings.

I claim:

1. In an oiling device, the combination of a rotary member having a crank pin and bearings for the rotary member on opposite sides of the crank pin having oil supply passages, and a passage in the rotary member and the crank pin having an outlet intermediate its ends opening into the surface of the crank pin and having inlets on opposite sides of the outlet to alternately communicate with the supply passages accordingly as the rotary member rotates in the bearings.

2. In an oiling device, the combination of a rotary member having a crank pin and a bearing on the crank pin, an oil passage in the rotary member having an outlet opening into the surface of the crank pin at a point off-set with respect to a plane extending through the axes of the rotary member and the crank pin and having inlets on opposite sides of the outlet communicating alternately with an oil supply, and a channel in the bearing to receive oil from the passage and lying outside of the essential pressure area of the bearing.

3. In an oiling device, the combination of a rotary member having a crank pin and a bearing on the crank pin, an oil passage in the rotary member, a pair of outlets for the oil passage having intersecting axes and one of said passages opening into the surface of the crank pin at a point off-set with respect to a plane extending through the axes of the rotary member and the crank pin, and channels in opposite sides of the bearing in non-communicating relationship with respect to each other to receive oil from the passage and lying outside of the essential pressure areas of the bearing.

FRITJOF FRELIN.